(12) United States Patent
Gupta et al.

(10) Patent No.: US 11,431,367 B2
(45) Date of Patent: Aug. 30, 2022

(54) SYSTEM FOR CANCELLING INTERFERENCE IN A FULL-DUPLEX WIRELINE COMMUNICATION LINK

(71) Applicant: INDIAN INSTITUTE OF TECHNOLOGY, BOMBAY, Maharashtra (IN)

(72) Inventors: Shalabh Gupta, Maharashtra (IN); Pranav Agarwal, Jharkhand (IN); Sandeep Goyal, Delhi (IN)

(73) Assignee: INDIAN INSTITUTE OF TECHNOLOGY, BOMBAY, Maharashtra (IN)

( * ) Notice: Subject to any disclaimer, the term of this patent is extended or adjusted under 35 U.S.C. 154(b) by 3 days.

(21) Appl. No.: 16/914,628

(22) Filed: Jun. 29, 2020

(65) Prior Publication Data
US 2021/0006277 A1    Jan. 7, 2021

(30) Foreign Application Priority Data
Jun. 28, 2019 (IN) .............................. 201921025968

(51) Int. Cl.
     *H04B 3/20*      (2006.01)
     *H04B 1/12*      (2006.01)
     *H04B 1/525*     (2015.01)
     *H04L 5/14*      (2006.01)

(52) U.S. Cl.
     CPC .............. *H04B 1/123* (2013.01); *H04B 1/525* (2013.01); *H04L 5/14* (2013.01)

(58) Field of Classification Search
CPC .......... H04B 1/123; H04B 1/525; H04B 3/46; H04B 17/345; H04L 5/14; H04L 12/2885; H04W 52/245; H04W 52/46; H04W 72/042; H04W 74/0816; H04W 52/241; H04W 52/36; H04J 11/004; H04J 3/0685; H04K 1/02; H04K 2203/16; H04K 2203/18; H04K 2203/36; H04K 3/41; H04K 3/42; H04K 3/43; H04K 3/44; H04K 3/825; H04K 1/00; H03C 3/0975
See application file for complete search history.

(56) References Cited

U.S. PATENT DOCUMENTS

| | | | |
|---|---|---|---|
| 9,413,516 B2* | 8/2016 | Khandani | H04B 1/525 |
| 10,200,076 B1* | 2/2019 | Choi | H04B 1/525 |
| 10,257,746 B2* | 4/2019 | Jain | H04B 10/25752 |
| 10,291,384 B2* | 5/2019 | Askar | H04B 1/1027 |
| 10,320,493 B2* | 6/2019 | Noh | H04W 52/04 |
| 10,382,085 B2* | 8/2019 | Choi | H04B 1/123 |
| 10,771,106 B1* | 9/2020 | Jin | H04L 12/2898 |

(Continued)

*Primary Examiner* — Stephen M D Agosta
(74) *Attorney, Agent, or Firm* — Tim Tingkang Xia, Esq.; Locke Lord LLP (57) ABSTRACT

The present invention relates to a system for cancelling interference in a full-duplex wireline communication link. The communication link has a transceiver at each end and configured to transmit a signal and receive a signal. The transceiver comprises: a self-interference (SI) canceller module configured to subtract self-interference of the signal transmitted by the transceiver from the signal received by the same transceiver in analog domain; and an echo canceller module configured to subtract reflected version of the signal transmitted by the transceiver from the signal received by the same transceiver in analog domain.

16 Claims, 12 Drawing Sheets

(56) References Cited

U.S. PATENT DOCUMENTS

| | | | |
|---|---|---|---|
| 2003/0081705 A1* | 5/2003 | Miller | H04L 25/14 375/346 |
| 2003/0165184 A1* | 9/2003 | Welborn | H04L 27/02 375/146 |
| 2010/0158173 A1* | 6/2010 | Lee | H04L 25/0212 375/346 |
| 2013/0089009 A1* | 4/2013 | Li | H04L 27/2601 370/278 |
| 2015/0049834 A1* | 2/2015 | Choi | H04L 5/14 375/285 |
| 2015/0180426 A1* | 6/2015 | Kingsley | H03F 3/60 330/277 |
| 2015/0311931 A1* | 10/2015 | Rozental | H04B 1/123 375/343 |
| 2016/0261304 A1* | 9/2016 | Apsel | H03F 3/193 |
| 2017/0019242 A1* | 1/2017 | Jin | H04B 3/487 |
| 2018/0006795 A1* | 1/2018 | Raaf | H04B 1/44 |
| 2018/0294941 A1* | 10/2018 | Chapman | H04B 3/32 |
| 2018/0358997 A1* | 12/2018 | Shekhar | H04B 1/56 |
| 2019/0044555 A1* | 2/2019 | Hewavithana | H04B 3/20 |
| 2019/0097674 A1* | 3/2019 | Grave | H04B 3/232 |
| 2019/0222296 A1* | 7/2019 | Khandani | H04B 7/1555 |
| 2019/0356353 A1* | 11/2019 | Nuzman | H04B 1/12 |
| 2021/0227205 A1* | 7/2021 | Bschor | H04N 21/44245 |

\* cited by examiner

SYSTEM FOR CANCELLING INTERFERENCE IN A FULL-DUPLEX WIRELINE COMMUNICATION LINK

CROSS-REFERENCE TO RELATED PATENT APPLICATION

This application claims priority to and the benefit of Indian Patent Application No. 201921025968, filed Jun. 28, 2019, which is incorporated herein in its entirety by reference.

FIELD OF THE INVENTION

The present invention relates to a full-duplex communication channel, and more particularly to a system for cancelling interference in a full-duplex wireline communication link.

BACKGROUND OF THE INVENTION

Full-duplex data transmission is used for transmitting and receiving data over a single channel at the same time between two terminals generally termed as far-end and near-end. Such terminals are generally in the form of transceivers having both a transmitter and a receiver. A signal generated by the transmitter of a terminal generally results in self-interference (SI) and echoes at the receiver of the same terminal. SI is a phenomenon where a receiver's performance is degraded by unrelated signals at the same or similar frequency to a desired signal, as signal coming out of the transmitter of a terminal, re-enters the receiver of the same terminal. Echo occurs when signal coming out of the transmitter of a terminal, re-enters the receiver of the same terminal after reflected by the channel. The SI and echo present a huge challenge to the receivers at both ends of the channel. As such, SI and echo are required to be canceled.

Hybrid transformers are generally used to cancel the SI and echo in case of Ethernet links. For SI and echo cancellation in higher-speed or longer distance full-duplex links, even after transformer based cancellation, very high dynamic range analog to digital converters (ADCs) are required. Such ADCs are difficult to design and consume high amount of power. SI and echo cancellation can also be achieved in analog domain to an acceptable level using an adaptive SI/echo canceller. In this regard, multiple delayed and weighted copies of signal transmitted by a given terminal are subtracted from the signal obtained at the receiver of the same terminal. The weight coefficients have to be tuned to ensure there is negligible component of the transmitted signal in the received signal after subtraction. The adjustment of weight coefficients is challenging, in particular when the remote terminal (far-end) transmitter is simultaneously transmitting.

Thus there is a need in the art for a SI and echo canceller which addresses at least the abovementioned problems.

SUMMARY OF THE INVENTION

In one aspect, the present invention provides a system for cancelling interference in a full-duplex wireline communication link. The communication link has a transceiver at each end and configured to transmit a signal and receive a signal. The transceiver comprises a self-interference (SI) canceller module and an echo canceller module. The SI canceller module is configured to subtract self-interference of the signal transmitted by the transceiver from the signal received by the same transceiver in analog domain. The echo canceller module is configured to subtract reflected version of the signal transmitted by the transceiver from the signal received by the same transceiver in analog domain.

In another aspect, the present invention provides a full-duplex wireline communication channel. The full-duplex wireline communication channel comprises two transceivers, one at each end of the communication link, configured to simultaneously transmit and receive data. Each of the transceivers is coupled with: an SI canceller module as claimed in preceding claims and configured to subtract self-interference of a signal transmitted by a transceiver from a signal received by the same transceiver in analog domain; and an echo canceller module configured as claimed in preceding claims and configured to subtract reflected version of the signal transmitted by the transceiver from the signal received by the same transceiver in analog domain.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

In one aspect, the present invention is directed towards a system for cancelling interference in a full-duplex wireline communication link. In another aspect, the present invention is directed towards a full-duplex wireline communication channel having the system for cancelling interference.

Figure 1:
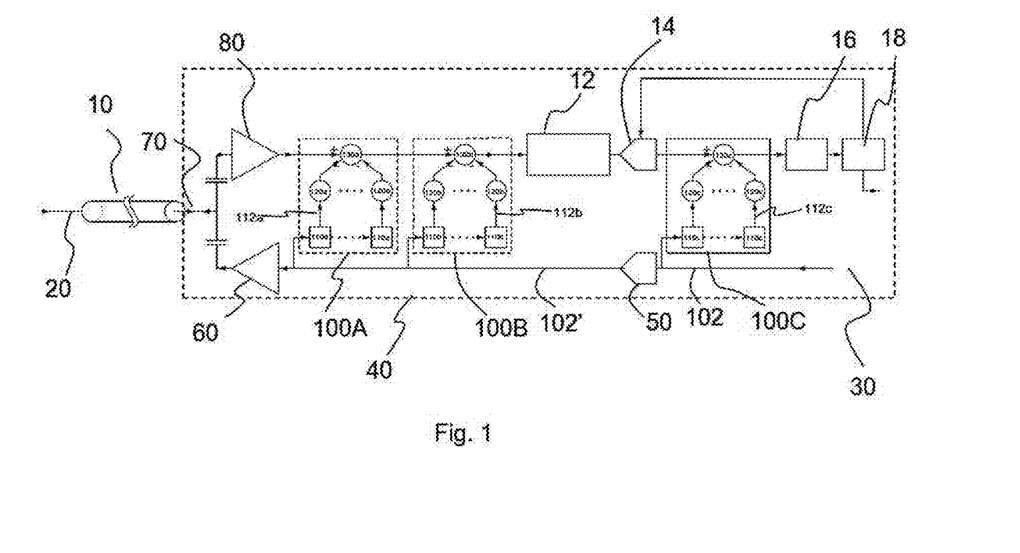
FIG. 1 shows a block diagram of a full-duplex communication channel and a system for cancelling interference in a full-duplex wireline communication link in accordance with an embodiment of the present invention.

A full-duplex communication wireline communication channel 10 is shown in FIG. 1. The communication channel has a far-end 20 and a near-end 30. Each end of the communication channel 10 is provided with a transceiver wherein each of the transceivers is configured to simultaneously transmit and receive data over the communication channel 10. In this regard, each of the transceivers transmits over same frequency band and bandwidth of the each of the signals transmitted through the channel 10 is more than one octave. Further, baud-rates used by transmitters of the two transceivers are independent of each other and modulation formats used by transmitters of the two transceivers are M1-PAM and M2-PAM, wherein values of M1 and M2 are independent of each other, each being an integer of value 2 or more.

In an embodiment of the invention, each of the transceivers is coupled to a system 40 for cancelling interference in the full-duplex wireline communication link. The system comprises a self-interference (SI) canceller module 100A and an echo canceller module 100B. For the purpose of describing the invention, it is assumed herein that the transceiver at the far-end 20 is only transmitting and transceiver at the near-end 30 is able to receive data in the presence of its own SI and echo.

As shown, a digital to analog converter 50 is provided to convert the transmitted digital signal 102 into analog signal 102'. The analog signal 102' is then fed to the SI canceller module 100A and the echo canceller module 100B. The analog signal 102' is passed through a line driver 60 which is configured to drive a low impedance line. Output from the line driver 60 together with the signal 70 received from the far-end transceiver is fed to the SI canceller module 100A. In this regard, the SI canceller module 100A is configured to subtract self-interference of the signal 102' transmitted by the transceiver from the signal received by the transceiver in analog domain. Further, the echo canceller module 100B receives signal from the SI canceller module 100A. The signal received from the SI canceller module 100A will essentially have minimal SI because of the cancellation performed by the SI cancellation module 100A. The echo canceller module 100B is configured to subtract reflected version of the signal 102' transmitted by the transceiver from the signal received by the transceiver in analog domain.

Further, a residual SI and echo cancellation module 100C is provided and configured to cancel residual SI and echo caused due to any long-delayed reflection of the transmitted signal in the channel or remaining after cancellation performed by the SI canceller module and echo canceller module in the analog domain of the transceiver. It may be noted residual SI and echo cancellation module 100C carries out the cancellation in digital domain of the transceiver. In this regard, signal 102 transmitted by the transceiver is provided to the residual SI and echo cancellation module 100C. Further, the signal from the SI and echo cancellation module 100A, 100B is passed through linear equalizer 12 and an analog to digital converter 14 and fed to the residual SI and echo cancellation module 100C. Output from the residual self-interference and echo canceller module 100C is passed through a decision feedback equalizer 16 followed by a clock and data recovery circuit 18 to recover the received bits.

Hereinafter, architecture of the SI canceller module 100A, the echo canceller module 100B and the residual self-interference and echo canceller module 100C in accordance with embodiments of the present invention is described in detail.

Figure 2:
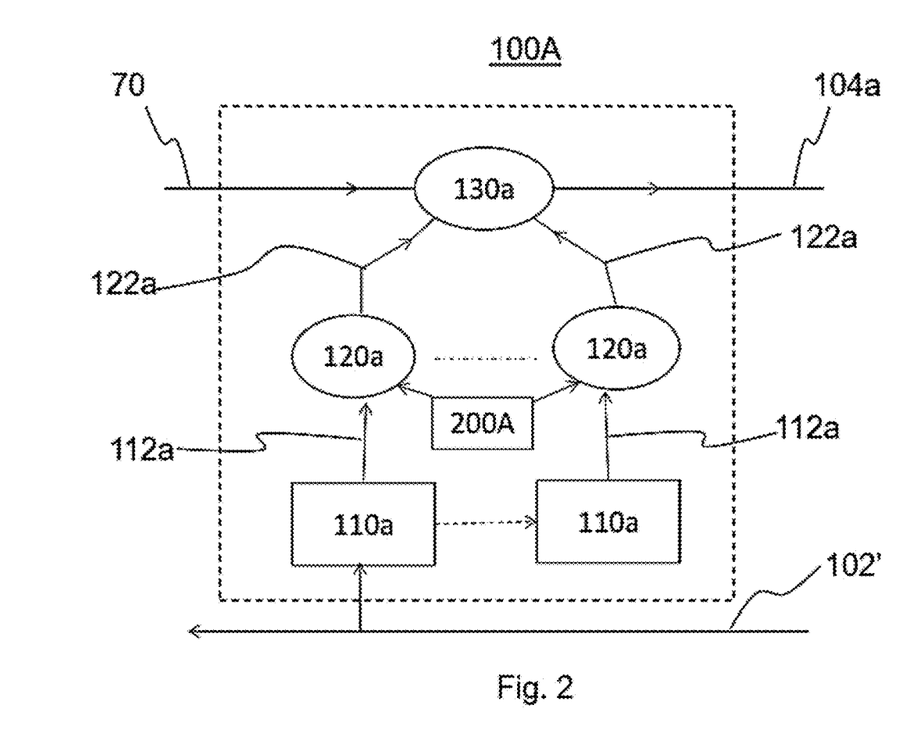
FIG. 2 shows a block diagram of a self-interference (SI) canceller module in accordance with an embodiment of the present invention.

Referring to FIG. 2, the SI canceller module 100A comprises a plurality of delay elements 110a, a plurality of multipliers 120a with adjustable weight coefficients, a correlator 200A and a summation circuit 130a. The delay elements 110a are connected in series and configured to receive a signal 102' transmitted by the transceiver at near-end 30. The delay elements 110a introduce a predetermined delay in the transmitted signal 102' and generate a delayed replica 112a of the transmitted signal. Each of the multiplier 120a is connected to a corresponding delay element 110a to receive the delayed replica 112a of the transmitted signal generated by the delay element 110a. The multipliers 120a amplify the delayed signal by a gain set in accordance with a gain control signal received from the correlator 200A. The summation circuit 130a subtracts output 122a of the multipliers 120a from the signal 70 received by the transceiver in analog domain.

Figure 3:
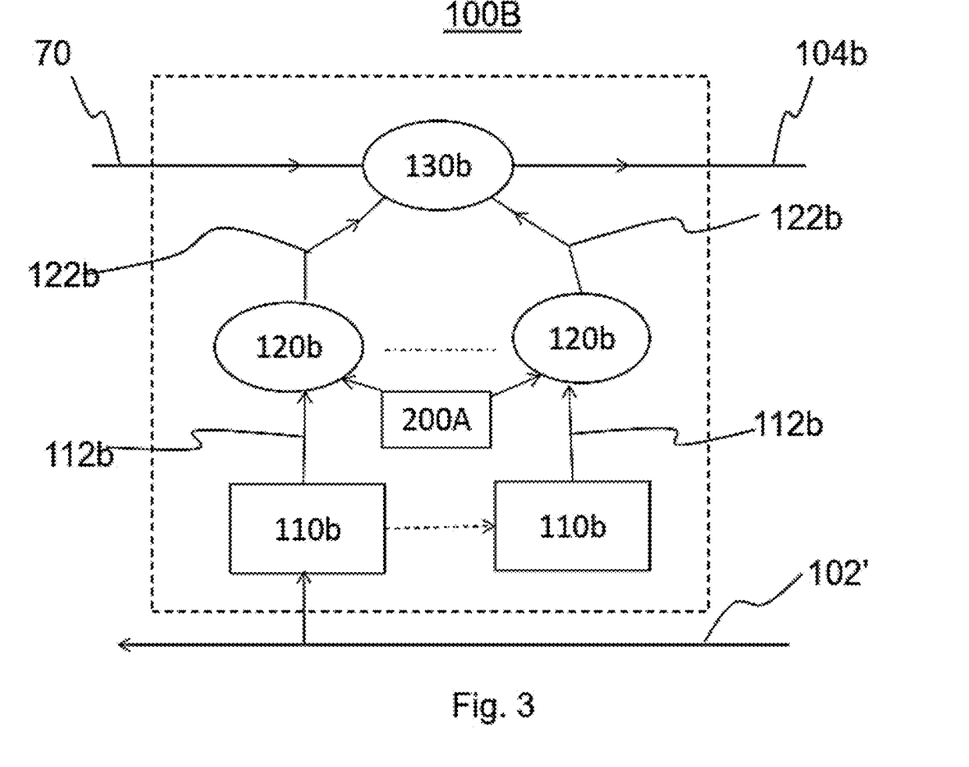
FIG. 3 shows a block diagram of an echo canceller module in accordance with an embodiment of the present invention.

Referring to FIG. 3, the echo canceller module 100B comprises a plurality of delay elements 110b, a plurality of multipliers 120b with adjustable weight coefficients, a correlator 200A and a summation circuit 130b. The delay elements 110b are connected in series and configured to receive a signal 102' transmitted by the transceiver at the near-end 30. The delay elements 110b introduce a predetermined delay in the transmitted signal 102' and generate a delayed replica 112b of the transmitted signal 102'. Each of the multiplier 120b is connected to a corresponding delay element 110b to receive the delayed replica 112b of the transmitted signal 102' generated by the delay element 110b. The multipliers 120b amplify the delayed signal by a gain set in accordance with a gain control signal received from the correlator 200A. The summation circuit 130b subtracts output 122b of the multipliers 120b from the signal received 70 by the transceiver in analog domain.

Figure 4:
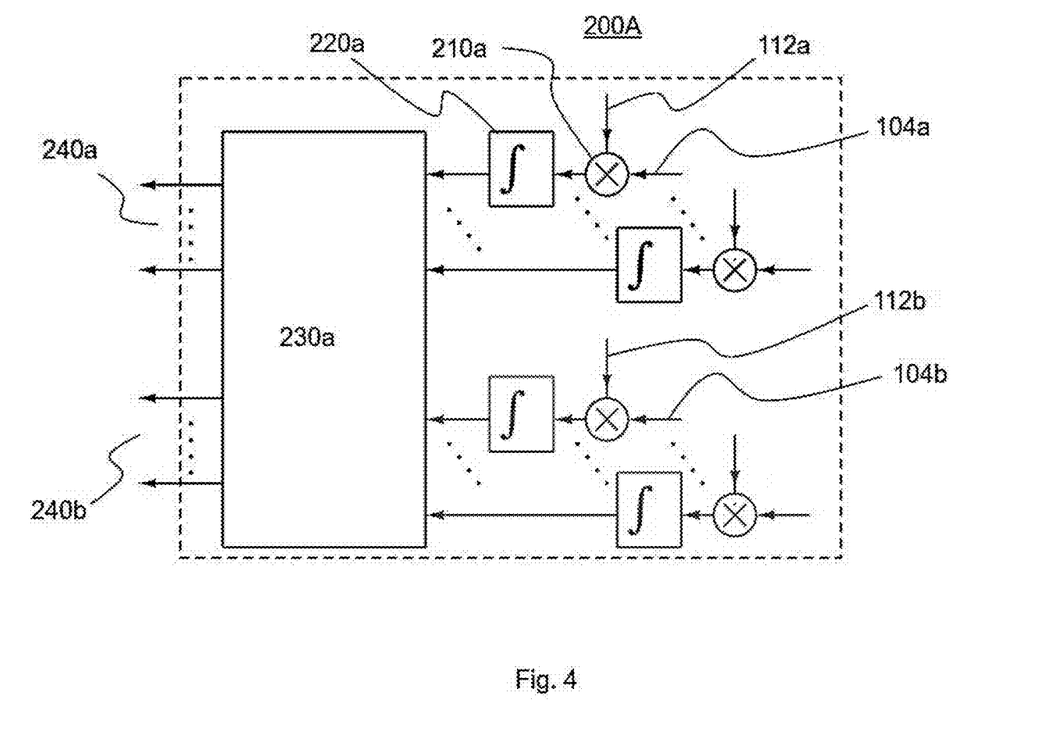
FIG. 4 shows a block diagram of a correlator for the SI canceller module and the echo canceller module in accordance with an embodiment of the present invention.

The correlator of the SI canceller module 100A and that of the echo canceller module 100B are similar in architecture and configuration, details of which are shown in FIG. 4. The correlator 200A is configured to determine a correlation between the output of the SI canceller module 100A or that of the echo canceller module 100B and each delayed replica 112a, 112b of the transmitted signal. In this regard, the SI canceller module 100A and the echo canceller module 100B for a given transceiver are configured to adapt its weight coefficients in the background without imposing any restriction on the signal transmitted by a far-end transceiver. The correlator 200A has an adjustable rate at which gains of the multipliers are updated.

The correlator 200A has a plurality of multipliers 210a and a plurality of integrators 220a. Each of the multipliers 210a has a first input coupled to a corresponding delay element 110a, 110b to receive the delayed replica 112a, 112b of the transmitted signal 102' and a second input coupled to the SI canceller module 100A or to the echo canceller module 100B, as the case may be, to receive the output signal 104a, 104b from the SI canceller module 100A or from the echo canceller module 100B. Each of the integrators 220a receives output from the corresponding multiplier 210a. In an embodiment of the invention, the integrator 220a is implemented in digital domain as an accumulator. In another embodiment of the invention, the integrator 220a is implemented using a charge pump or a high gain transconductance amplifier followed by a capacitor. The weight initialize and storage unit 230a is configured to receive output from each of the integrators and provide a gain control signal 240a, 240b to the corresponding multiplier 120a, 120b of the SI canceller module 100A or that of the echo canceller module 100B. In an embodiment of the invention, the weight initialize and storage unit 230a can be an integrator.

As described hereinbefore, even after cancelling the SI and echo in analog domain, there remains a residuary amount of SI and echo in the signal. Accordingly, in an embodiment of the invention, the system 40 also includes a residual SI and echo cancellation module 100C configured to cancel residual SI and echo, in digital domain, remaining after cancellation performed by the SI canceller module 100A and echo canceller module 100B in the analog domain of the transceiver. The residual SI and echo cancellation module 100C is further configured to cancel residual SI and echo, in digital domain of the transceiver, caused due to any long-delayed reflection of the transmitted signal in the channel.

Figure 5:
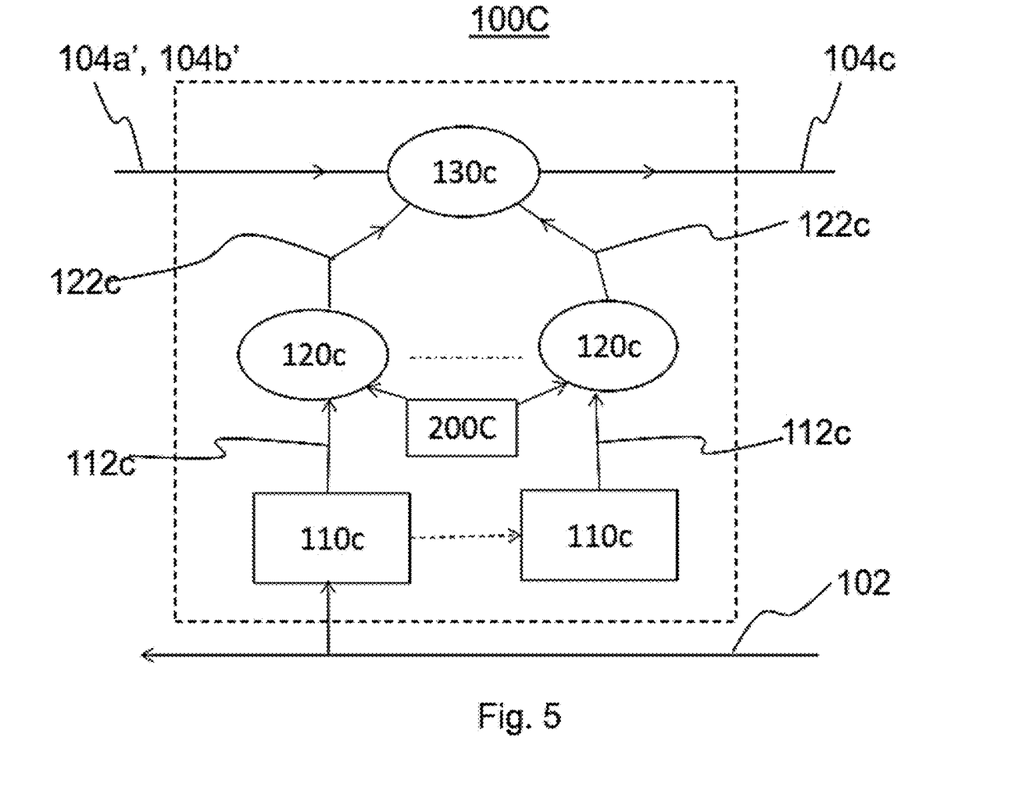
FIG. 5 shows a block diagram of a residual SI and echo cancellation module in accordance with an embodiment of the present invention.

Referring to FIG. 5, residual SI and echo cancellation module 100C comprises of a plurality of delay elements 110c, a plurality of multipliers 120c with adjustable weight coefficients, a correlator 200C and a summation circuit 130c. The delay elements 110c are connected in series and configured to receive the digital signal 102 transmitted by the transceiver. The delay elements 110c introduce a predetermined delay in the transmitted signal 102 and generate a delayed replica 112c of the transmitted signal 102. Each of the multiplier 120c is connected to a corresponding delay element 110c to receive the delayed replica of the transmitted signal generated by the delay element 110c. The multipliers 120c amplify the delayed signal by a gain set in accordance with a gain control signal received from the correlator 200C. The summation circuit 130c has a first input to receive a digital signal 104a', 104b' from the analog to digital converter 14 coupled to the SI and echo cancellation module 100A, 100B and a second input coupled to the output of each of the multipliers 120c to receive the amplified signal 122c. The summation circuit 130c subtracts output 122c of the multipliers 120c from the signal received by the transceiver in digital domain.

Figure 6:
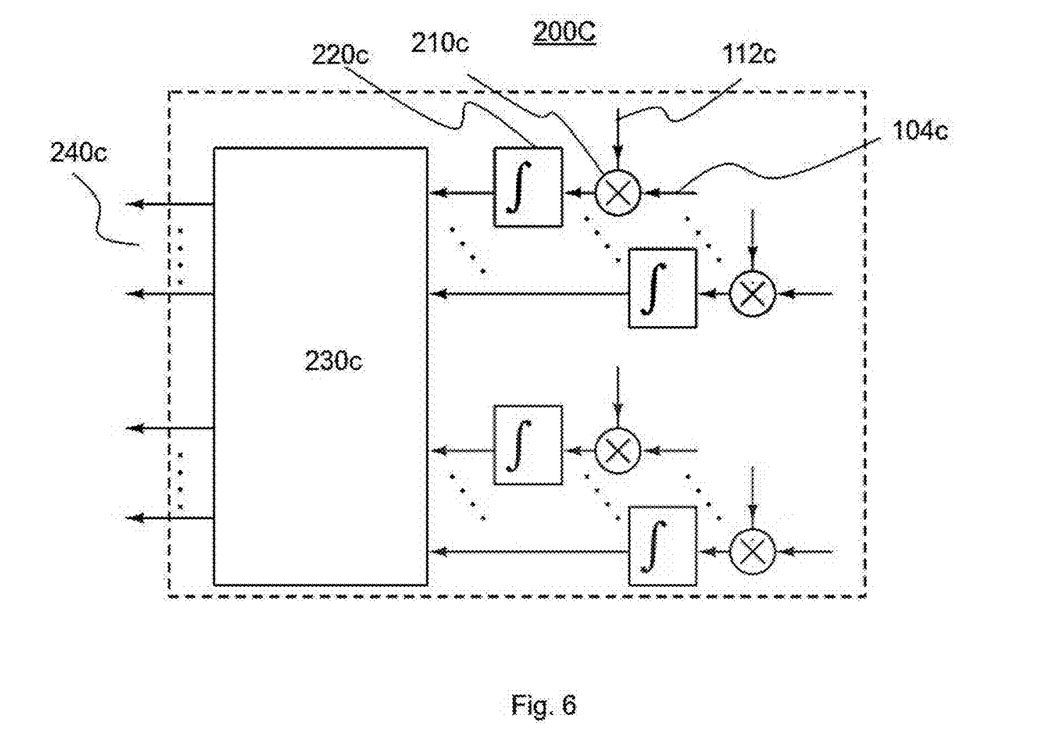
FIG. 6 shows a block diagram of a correlator for the residual SI and echo cancellation module in accordance with an embodiment of the present invention.

The correlator 200C is configured to determine a correlation between the output of the residual SI and echo cancellation module and each delayed replica of the transmitted signal. As shown in FIG. 6, the correlator 200C has a plurality of multipliers 210c and a plurality of integrators 220c. Each of the multipliers 210c has a first input coupled to a corresponding delay element 110c to receive the delayed replica 112c of the transmitted signal 102 and a second input coupled to the residual SI and echo cancellation module 100C to receive the output signal 104c. Each of the integrators 220c receives output from the corresponding multiplier 210c. In an embodiment of the invention, the integrator 220c is implemented in digital domain as an accumulator. In another embodiment of the invention, the integrator 220c is implemented using a charge pump or a high gain transconductance amplifier followed by a capacitor. The weight initialize and storage unit 230c is configured to receive output from each of the integrators and provide a gain control signal 240c to the corresponding multiplier 120c of the residual SI and echo cancellation module 100C. The correlator 200c has an adjustable rate at which gains of the multipliers are updated.

Figure 7A:
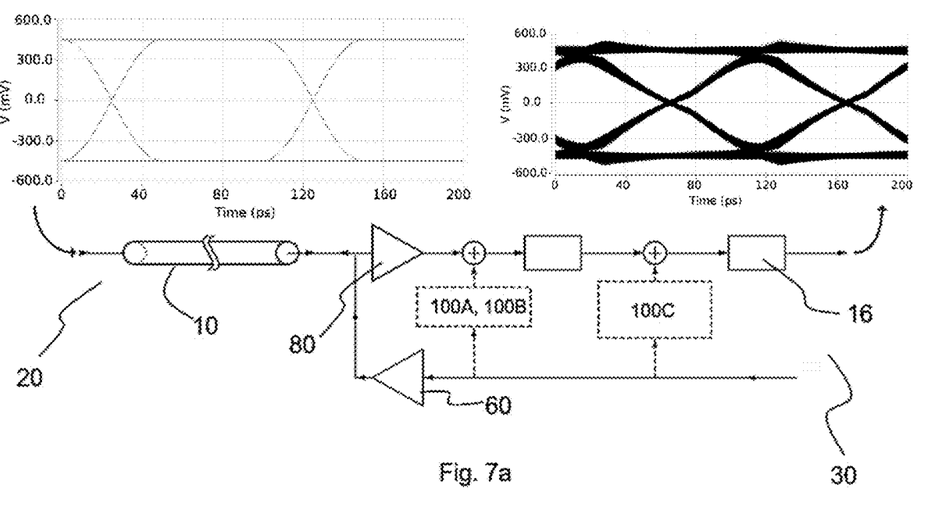
FIGS. 7a-7c show results of an experiment carried out using the system of the present invention on a 10 m long single channel with 10% impedance mismatch at data-rate of 10 Gbps in either direction.
Figure 7B:
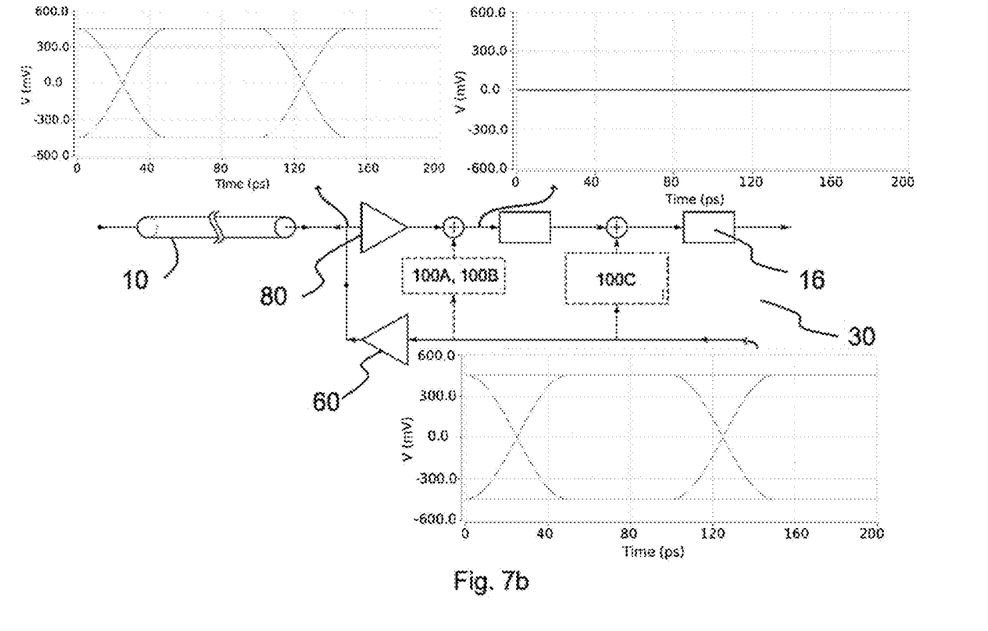
Figure 7C:
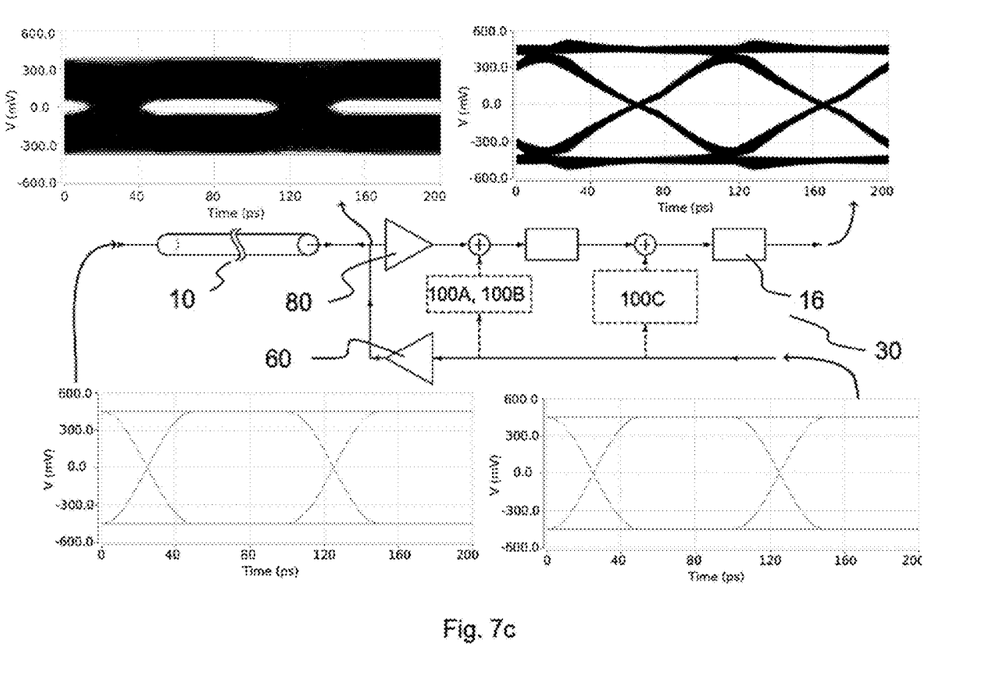

FIGS. 7a-7c show results of an experiment carried out using the system of the present invention on a 10 m long channel with 10% impedance mismatch at data-rate of 10 Gbps in either direction. As shown in FIG. 7a wherein only far-end terminal is only transmitting and signal is received without any interference because of the absence of self-interference or echo from near-end terminal. In FIG. 7b, only near-end is transmitting and system of the present invention is working because of the introduction of self-interference and echo. In this case, the system of the present invention was able to remove the self-interference and echo in analog domain and thus there was no residue. In FIG. 7c, far-end as well as near-end is transmitting. As shown, the system of the present invention was able to recover the far-end signal.

Figure 8A:
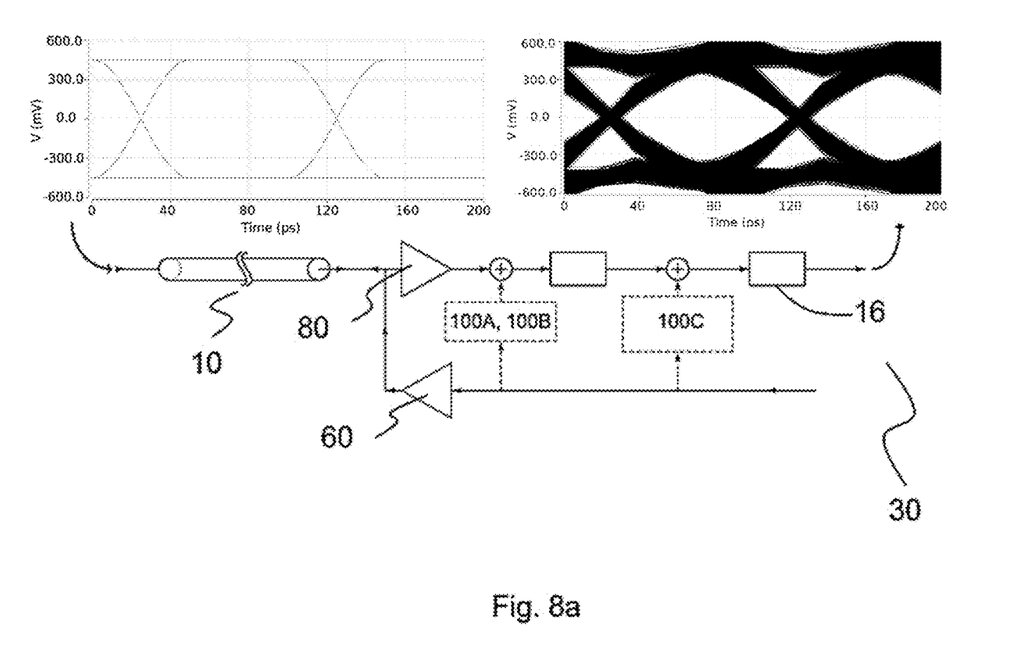
FIGS. 8a-8c show results of an experiment carried out using the system of the present invention on a 10 m long single channel causing reflections of a transmitted signal at data-rate of 10 Gbps in either direction.
Figure 8B:
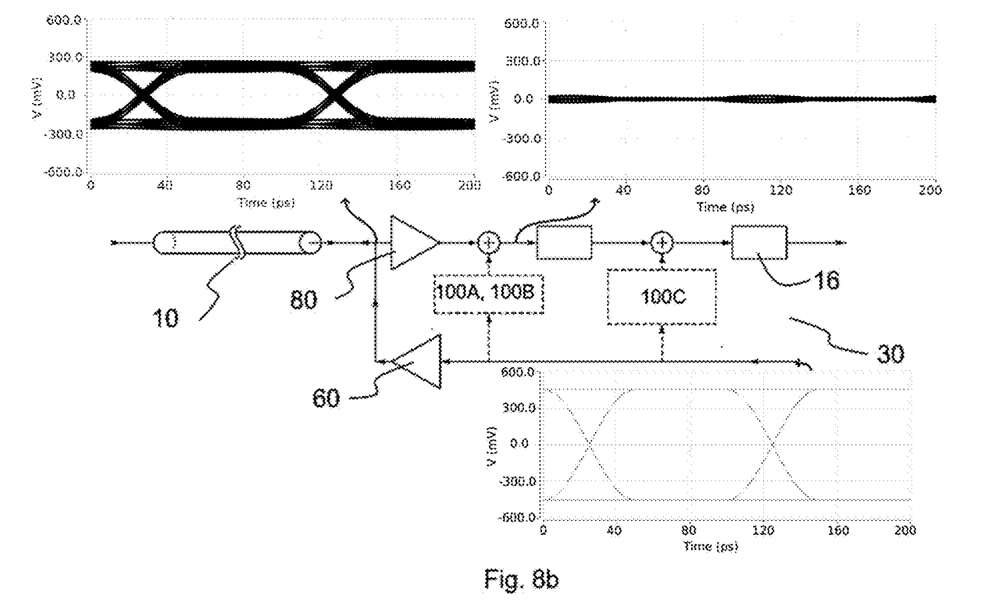
Figure 8C:
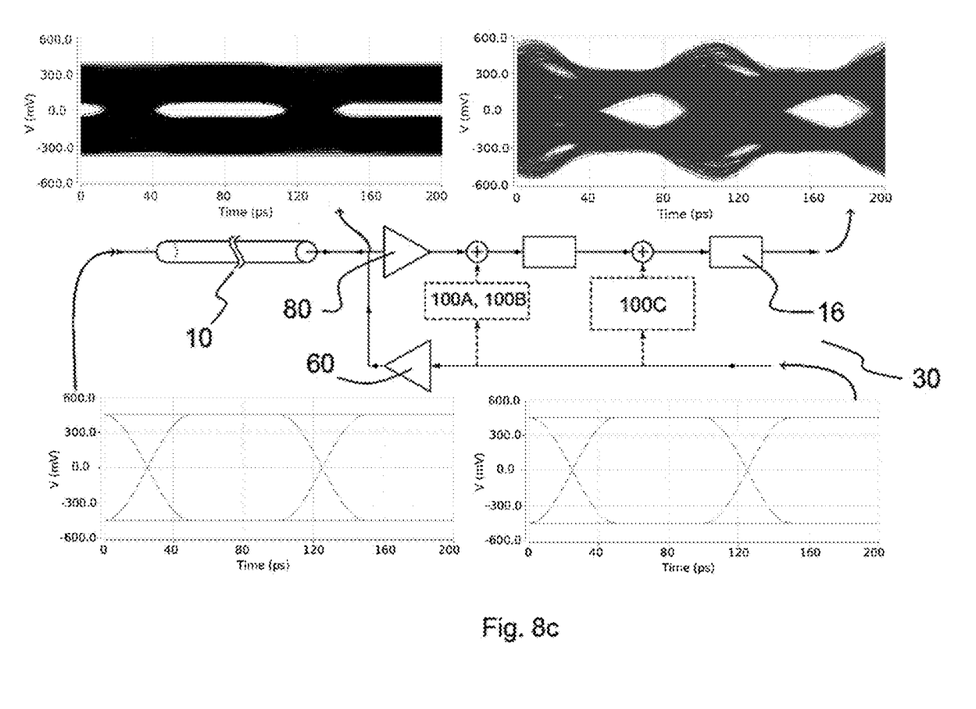

FIGS. 8a-8c show results of an experiment carried out using the system of the present invention on a 10 m long channel causing reflections of a transmitted signal at datarate of 10 Gbps in either direction. As shown in FIG. 8a wherein only far-end terminal is only transmitting and signal is received without any interference because of the absence of self-interference or echo from near-end terminal. In FIG. 8b, only near-end is transmitting and system of the present invention is working because of the introduction of self-interference and echo. In this case, the system of the present invention was able to remove the self-interference and echo in analog domain and thus there was no residue. In FIG. 8c, far-end as well as near-end is transmitting. As shown, the system of the present invention was able to recover the far-end signal.

Advantageously, the adaptive interference canceller and the system of the present invention cancel most of the self-interference and echo from a transmitter to the receiver of one terminal. Since there is no tuning time and known training sequence required for adapting the weights of SI and echo canceller, adaptive interference canceller doesn't add any overhead on the speed requirements. As the adaptive interference canceller of the present invention can be implemented in analog domain and can cancel most of self-interference, the dynamic range and power consumption for ADC required to further process the signal in the digital domain is significantly reduced. The residual self-interference can further be cancelled in the digital domain.

While the present invention has been described with respect to certain embodiments, it will be apparent to those skilled in the art that various changes and modification may be made without departing from the scope of the invention as defined in the following claims.

What is claimed is:

1. A system for cancelling interference in a full-duplex wireline communication link having a transceiver at each end of the communication link configured to transmit a signal and receive a signal, the transceiver comprising:
   a self-interference (SI) canceller module configured to subtract self-interference of the signal transmitted by the transceiver from the signal received by the same transceiver in analog domain; and
   an echo canceller module configured to subtract reflected version of the signal transmitted by the transceiver from the signal received by the same transceiver in analog domain,
   wherein the SI canceller module comprises:
   a plurality of delay elements, each delay element configured to receive the signal transmitted by the transceiver and generate a delayed replica of the transmitted signal;
   a plurality of multipliers with adjustable weight coefficients, each of the multiplier configured to receive and amplify the delayed replica of the transmitted signal;
   a summation circuit configured to subtract output of the multipliers from the signal received by the transceiver in analog domain; and
   a correlator configured to determine a correlation between the output of the SI canceller module and each delayed replica of the transmitted signal, the correlator having a plurality of multipliers and a plurality of integrators configured to adaptively adjust weight coefficients of each of the multipliers of the SI canceller module.

2. The system as claimed in claim 1, wherein the SI canceller module and the echo canceller module for a given transceiver are configured to adapt its weight coefficients in the background without imposing any restriction on the signal transmitted by a far-end transceiver.

3. The system as claimed in claim 1, wherein the correlator has an adjustable rate at which gains of the multipliers are updated.

4. The system as claimed in claim 1, comprising a residual SI and echo cancellation module configured to cancel residual SI and echo, in digital domain of the transceiver, caused due to any long-delayed reflection of the transmitted signal in the channel.

5. The system as claimed in claim 4, wherein the residual SI and echo cancellation module is configured to cancel residual SI and echo, in the digital domain, remaining after cancellation performed by the SI canceller module and echo canceller module in the analog domain of the transceiver.

6. The system as claimed in claim 5, wherein the residual SI and echo cancellation module comprising:
   a plurality of delay elements, each delay element configured to receive the signal transmitted by the transceiver and generate a delayed replica of the transmitted signal;
   a plurality of multipliers with adjustable weight coefficients, each of the multiplier configured to receive and amplify the delayed replica of the transmitted signal; and
   a summation circuit configured to subtract output of the multipliers from the signal received by the transceiver in the digital domain.

7. The system as claimed in claim 6, wherein the residual SI and echo cancellation module comprises a correlator configured to determine a correlation between the output of the residual SI and echo cancellation module and each delayed replica of the transmitted signal, the correlator having a plurality of multipliers and a plurality of integrators configured to adaptively adjust weight coefficients of each of the multipliers of the residual SI and echo cancellation module.

8. The system as claimed in claim 7, wherein the correlator has an adjustable rate at which gains of the multipliers are updated.

9. The system as claimed in claim 1, wherein the SI canceller module, the echo canceller module, the residual SI and echo cancellation module are fabricated on a single integrated chip.

10. A system for cancelling interference in a full-duplex wireline communication link having a transceiver at each end of the communication link configured to transmit a signal and receive a signal, the transceiver comprising:
   a self-interference (SI) canceller module configured to subtract self-interference of the signal transmitted by the transceiver from the signal received by the same transceiver in analog domain; and
   an echo canceller module configured to subtract reflected version of the signal transmitted by the transceiver from the signal received by the same transceiver in analog domain,
   wherein the echo canceller module comprises:
   a plurality of delay elements, each delay element configured to receive the signal transmitted by the transceiver and generate a delayed replica of the transmitted signal;
   a plurality of multipliers with adjustable weight coefficients, each of the multiplier configured to receive and amplify the delayed replica of the transmitted signal;
   a summation circuit configured to subtract output of the multipliers from the signal received by the transceiver in analog domain; and
   a correlator configured to determine a correlation between the output of the echo canceller module and each delayed replica of the transmitted signal, the correlator having a plurality of multipliers and a plurality of integrators configured to adaptively adjust weight coefficients of each of the multipliers of the echo canceller module.

11. The system as claimed in claim 10, wherein the correlator has an adjustable rate at which gains of the multipliers are updated.

12. A full-duplex wireline communication channel comprising:
   two transceivers, one at each end of the communication link, configured to simultaneously transmit and receive data; each of the transceivers coupled with: an SI canceller module configured to subtract self-interference of a signal transmitted by a transceiver from a signal received by the same transceiver in analog domain; and an echo canceller module configured to subtract reflected version of the signal transmitted by the transceiver from the signal received by the same transceiver in analog domain,
   wherein the SI canceller module comprises:
   a plurality of delay elements, each delay element configured to receive the signal transmitted by the transceiver and generate a delayed replica of the transmitted signal;
   a plurality of multipliers with adjustable weight coefficients, each of the multiplier configured to receive and amplify the delayed replica of the transmitted signal;
   a summation circuit configured to subtract output of the multipliers from the signal received by the transceiver in analog domain; and
   a correlator configured to determine a correlation between the output of the SI canceller module and each delayed replica of the transmitted signal, the correlator having a plurality of multipliers and a plurality of integrators configured to adaptively adjust weight coefficients of each of the multipliers of the SI canceller module.

13. The full-duplex wireless communication channel as claimed in claim 12, wherein each of the two transceivers transmits over the same frequency band.

14. The full-duplex wireless communication channel as claimed in claim 12, wherein bandwidth of each of the signals transmitted through the channel is more than one octave.

15. The full-duplex wireless communication channel as claimed in claim 12, wherein baud-rates used by transmitters of the two transceivers are independent of each other.

16. The full-duplex wireless communication channel as claimed in claim 12, wherein modulation formats used by transmitters of the two transceivers are M1-PAM and M2-PAM, wherein values of M1 and M2 are independent of each other, each being an integer of value 2 or more.

* * * * *